(12) United States Patent
Vereen et al.

(10) Patent No.: US 7,305,575 B2
(45) Date of Patent: *Dec. 4, 2007

(54) INTERFACE CIRCUIT THAT INTERCONNECTS A MEDIA ACCESS CONTROLLER AND AN OPTICAL LINE TERMINATION TRANSCEIVER MODULE

(75) Inventors: Jerry Darden Vereen, Coral Springs, FL (US); Thomas Jay Kitchens, Coral Springs, FL (US); Jose G. Betancourt, Miramar, FL (US)

(73) Assignee: Tellabs Petaluma, Inc., Petaluma, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/051,926

(22) Filed: Feb. 4, 2005

(65) Prior Publication Data

US 2006/0179339 A1 Aug. 10, 2006

(51) Int. Cl.
*G06F 1/00* (2006.01)
*G06F 1/04* (2006.01)
*G06F 1/02* (2006.01)

(52) U.S. Cl. .................................... 713/500; 713/501
(58) Field of Classification Search ............... 713/500, 713/501
See application file for complete search history.

(56) References Cited

U.S. PATENT DOCUMENTS

| | | | |
|---|---|---|---|
| 4,773,081 A * | 9/1988 | Morimoto | 375/267 |
| 5,583,458 A * | 12/1996 | Bazes | 327/3 |
| 6,194,927 B1 * | 2/2001 | Crowley et al. | 327/147 |
| 6,198,785 B1 * | 3/2001 | Flynn | 375/377 |
| 2005/0286643 A1 * | 12/2005 | Ozawa et al. | 375/242 |
| 2006/0133809 A1 * | 6/2006 | Chow et al. | 398/66 |
| 2006/0274875 A1 * | 12/2006 | Vereen et al. | 375/371 |

* cited by examiner

*Primary Examiner*—Thomas Lee
*Assistant Examiner*—Michael Wang
(74) *Attorney, Agent, or Firm*—Mark C. Pickering (57) ABSTRACT

A communication system includes an interface that allows a media access controller (MAC) and an optical line termination transceiver module (TM), which have incompatible interfaces, to be connected together. The interface detects a phase relationship required by the TM, and feeds the information back to a processor and memory which places a value into the MAC to adjust the phase relationship.

20 Claims, 6 Drawing Sheets

FIG. 5A
CLK1

FIG. 5B
CLK2

FIG. 5C
SLK

FIG. 5D
RST

FIG. 5E
SOF P1 P2 P3 P4

FIG. 6A
SLK1

FIG. 6B
SLK2

FIG. 6C
SLK3

FIG. 7

INTERFACE CIRCUIT THAT INTERCONNECTS A MEDIA ACCESS CONTROLLER AND AN OPTICAL LINE TERMINATION TRANSCEIVER MODULE

BACKGROUND OF THE INVENTION

1. Field of the Invention

The present invention relates to an interface circuit and, more particularly, to an interface circuit that interconnects a media access controller and an optical line termination transceiver module.

2. Description of the Related Art

In a conventional passive optical network (PON), one needs to be able to connect a media access controller (MAC) to an optical line termination Transceiver Module (TM). When the MAC and the TM are provided by the same manufacturer, connectivity is rarely an issue because the components are designed to operate together.

However, little interface standardization has occurred within the industry. As a result, it is often the case that a MAC that was produced by a first manufacturer can not be connected to a TM that was produced by a second manufacturer because the two components have incompatible interfaces.

For example, during normal operation, a TM receives a series of upstream cells from a MAC. (Each upstream cell can include, for example, 53×8 or 424 bits, based on 53 octets per cell.) Each time an upstream cell is received, the TM reacquires the needed cell timing. Further, to receive upstream cells, a TM typically requires that one burst clock-data-recovery (CDR) reset pulse accompany each upstream cell, and occur at a specific time with respect to each upstream cell.

In addition, the TM typically defines the width and active state polarity of the burst CDR reset pulse. Further, the TM has set up and hold time requirements. To meet these requirements, the burst CDR reset pulse should be received by the TM at a time that allows the rising edge of a module clock signal to occur as close as possible to a best margin position within the burst CDR reset pulse. (One position within the burst CDR reset pulse provides the best margin in terms of satisfying the set up and hold times of the TM.)

For example, a TM can output two clock signals, such as a 39 MHz (38.88 MHz) module clock signal and a 156 MHz (155.52 MHz) bit clock signal, which is 4× greater than and frequency locked to the 39 MHz signal. Further, the TM can require that the active edge of the burst CDR reset pulse occur at a particular time with respect to the start of the next burst cycle.

In addition, the TM can require that the width of the burst CDR reset pulse be equal to a number of bit times, such as four bit times (four 156 MHz bit clock periods or one 39 MHz module clock period), and be active high. Thus, four rising edges of the 156 MHz bit clock signal or four phases can occur during a burst CDR reset pulse.

Further, in this example, to insure that the set up and hold times of the TM are met, the burst CDR reset pulse should be received by the TM at a time that allows the rising edge of the 39 MHz module clock signal to occur as close as possible to the center of the burst CDR reset pulse, i.e., on the third phase or third rising edge of the four 156 MHz clock periods that define the burst CDR reset pulse.

In addition, in this example, if the rising edge of the 39 MHz module clock signal occurs on another phase or rising edge (of the four 156 MHz clock periods that define the burst CDR reset pulse), the ends of the upstream cells or the beginnings of the upstream cells can be lost. When the ends of the upstream cells are lost, the data at the ends of the cells can be lost. When the beginnings of the upstream cells are lost, the preambles can be lost. When the preambles are lost, the entire upstream cells can be lost.

Therefore, to be able to interoperate with a TM, a MAC must be able to satisfy these requirements. MACs which are designed to operate with different TMs typically have a means, such as a burst CDR generation register, that controls when the burst CDR reset pulse is generated, the width of the burst CDR reset pulse, and the active state polarity of the burst CDR reset pulse.

For example, a burst CDR register can have an N-bit field (e.g., 9-bit field) that defines 1 of 512 bit locations where the active edge of the burst CDR signal occurs with respect to the start of the next burst cycle. The register can also have a K-bit field that defines the active state pulse width. For example, the K-bit field could be 3-bits wide to allow up to an 8-bit wide active state pulse.

The burst CDR register can also have a G-bit field (e.g., 1-bit field) that defines the active state polarity of the pulse. Regardless of the method of implementation, the ability to control the generation of the burst CDR reset pulse with respect to the arrival of upstream cells is assumed to be available in MAC devices that allow interoperation with different TMs.

Thus, for example, a value equal to four can be placed in the K-bit pulse width field to define a 4-bit wide active state pulse, while a value can be placed in the G-bit polarity field to represent an active high polarity. In addition, a seed value can be placed in the N-bit field which sets the burst CDR reset pulse in its "ideal" starting position. This position is determined by the TM data sheet.

The ideal starting position, however, does not always provide the ideal position. As a result, the value placed in the N-bit field can not be used to insure that the rising edge of the 39 MHz module clock signal occurs as close as possible to the center of the burst CDR reset pulse, i.e., on the third phase or third rising edge of the four 156 MHz clock periods that define the burst CDR reset pulse.

At power up, or as a result of phase shifts occurring on the 156 MHz bit clock signal, the phase relationship of the 39 MHz module clock signal with respect to the 156 MHz bit clock signal can end up in any one of four phases. In other words, when the N-bit field has the ideal starting position, the rising edge of the 39 MHz module clock signal can occur with the rising edge of any one of the four rising edges of the 156 MHz bit clock signal that define the burst CDR reset pulse width.

For example, in one case, a value of X placed in the N-bit field of the burst CDR generation register can cause the 39 MHz module clock signal to rise on the third phase or third rising edge of the four 156 MHz bit clock periods of the burst CDR reset pulse. In another case, however, the same value of X can cause the 39 MHz module clock signal to rise on one of the other three phases or rising edges of the four 156 MHz bit clock periods of the burst CDR reset pulse which, in turn, may not provide the needed set up and hold times required by the TM.

As a result, the value placed in the N-bit field can not be used to insure that the rising edge of the 39 MHz module clock signal occurs as close as possible to the center of the burst CDR reset pulse, i.e., with the third phase or third rising edge of the four 156 MHz clock periods that define the burst CDR reset pulse.

If the MAC receives both the 39 MHz module clock signal and the 156 MHz bit clock signal, then the center of the burst CDR reset pulse can be adjusted with respect to the position of the 39 MHz module clock signal. For example, once the seed value has been loaded, the phase of the burst CDR reset pulse can be measured against the 39 MHz module clock signal. After the phase has been measured, any required bit level adjustments can then be made by loading new values in the N-bit field.

Loading new values in the N-bit field adjusts the position of the leading edge of the burst CDR reset pulse which, in turn, adjusts the phase. As a result, the phase position of the rising edge of the burst CDR reset pulse can be advanced or retarded in time by changing the value held by the N-bit field of the burst CDR generation register.

However, if the MAC has a 156 MHz clock input to receive the 156 MHz bit clock signal, but has no input to receive the 39 MHz module clock signal, then the MAC lacks any way of measuring the phase of the burst CDR reset pulse against the rising edge of the 39 MHz module clock signal. If there is no way to measure the phase, then there is no way of adjusting the phase to insure that the proper timing relationship exists between the burst CDR reset pulse and the 39 MHz module clock signal. As a result, the TM and MAC can not be reliably used together.

Thus, there is a need for an approach that insures that the TM receives the burst CDR reset pulse at the proper time with respect to the 39 MHz module clock signal when the 39 MHz module clock signal is unavailable to the MAC.

SUMMARY OF THE INVENTION

An interface circuit is disclosed. The interface circuit includes a sampling circuit to generate and output a sampled clock signal in response to a first clock signal and a second clock signal, and a start of frame pulse in response to a reset pulse and the second clock signal. The start of frame pulse has a width, which has an integer number of phases defined by a corresponding number of second clock periods. The sampled clock signal has a rising edge that coincides with a phase of the start of frame pulse.

A method of operating an interface circuit is disclosed according to an embodiment of the invention. An edge of a first clock signal is aligned to an edge of a second clock signal to form a sampled clock signal. In addition, an edge of a pulse is aligned to an edge of the second clock signal to form a start of frame pulse. The start of frame pulse has a plurality of phases that correspond to a plurality of periods of the second clock signal. An edge of the sampled clock signal is aligned with a phase of the start of frame pulse.

A method of determining a value for a burst CDR generation register is disclosed according to an embodiment of the present invention. A first value is read, and looked up in a look up table to determine a register value. In addition, the register value is written into the burst CDR generation register.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
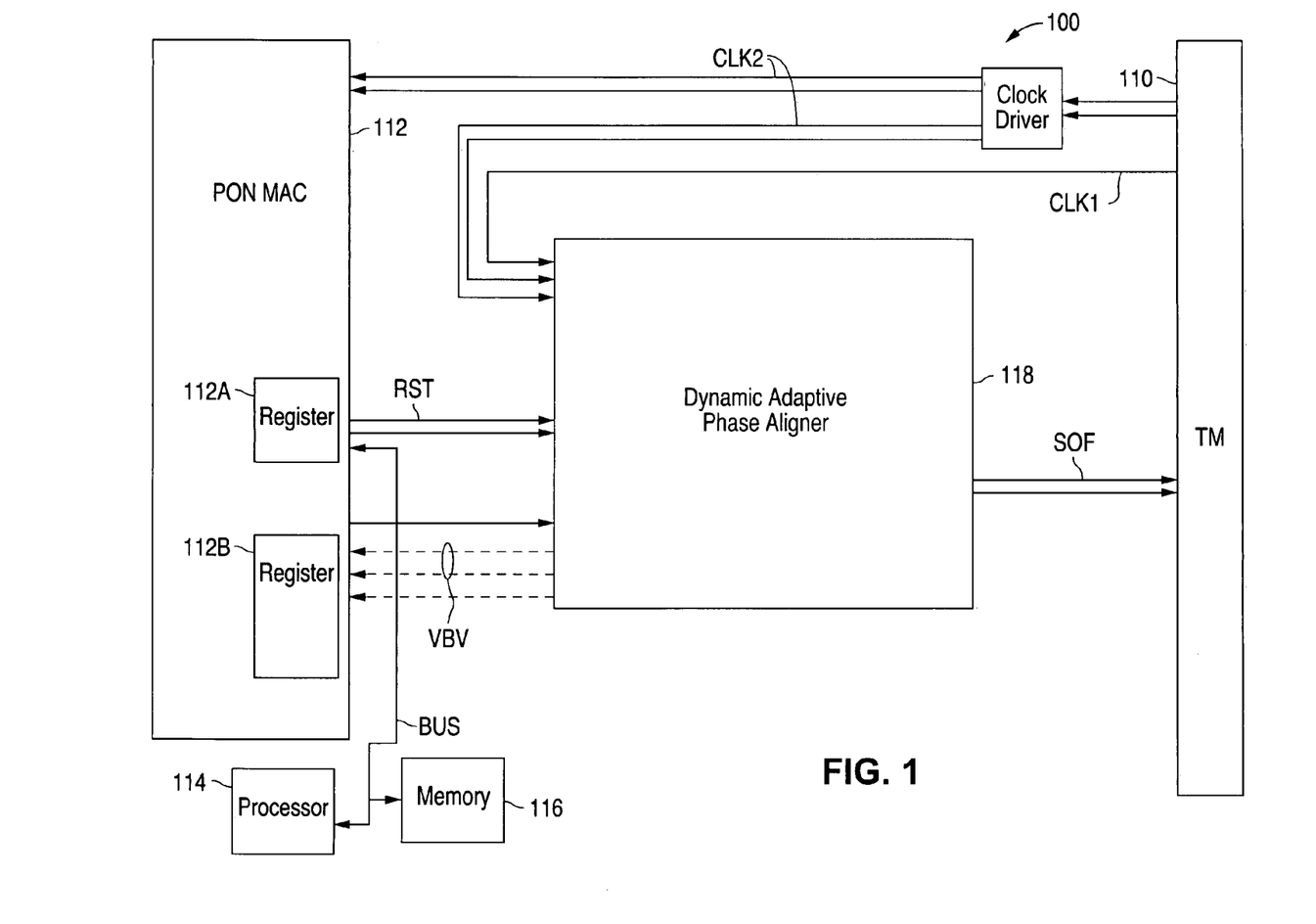
FIG. 1 is a block diagram illustrating an example of a communication system 100 in accordance with the present invention.

FIG. 1 shows a block diagram that illustrates an example of a communication system 100 in accordance with the present invention. As described in greater detail below, communication system 100 includes an interface that allows a media access controller and an optical line termination transceiver module, which have incompatible interfaces, to be connected together.

As shown in FIG. 1, communication system 100 includes an optical line termination transceiver module (TM) 110 that outputs a first clock signal CLK1 and a second clock signal CLK2, which is a multiple of the first clock signal CLK1. For example, the first clock signal CLK1 can have a frequency of 39 MHz (38.88 MHz), while the second clock signal CLK2 can have a frequency of 156 MHz (155.52 MHz), which is 4× greater. Further, the first and second clock signals CLK1 and CLK2 can be frequency locked to each other.

In addition to outputting the first and second clock signals CLK1 and CLK2, TM 110 also receives a series of upstream cells, and a start of frame pulse SOF that accompanies each upstream cell. In the present example, TM 110 requires that the start of frame pulse SOF, which TM 110 interprets to be the burst CDR reset pulse, occur at a specific time with respect to each upstream cell.

Further, TM 110 defines a width of the start of frame pulse SOF, as well as an active state polarity. In the present example, the start of frame pulse SOF can be four bit times long (four second-clock periods long or one first-clock period). Thus, four rising edges of the second clock signal CLK2 or four phases occur during the start of frame pulse SOF. In addition, the start of frame pulse SOF can be active high.

Further, to insure that the set up and hold times of TM 110 are met, the rising edge of the first clock signal CLK1 should occur as close as possible to one of the four phase positions of the four-bit wide SOF pulse. (One of the four phase positions provides the best margin in terms of satisfying the set up and hold times of TM 110.) In the present example, to insure that the set up and hold times are met, the rising edge of the first clock signal CLK1 occurs as close as possible to the center of the SOF pulse, i.e., on the third phase or third rising edge of the four second-clock periods that define the SOF pulse.

Communication system 100 also includes a passive optical network (PON) media access controller (MAC) 112 that receives the second clock signal CLK2, and outputs a burst CDR reset pulse RST. In the present example, MAC 112 does not utilize or receive the first clock signal CLK1.

In addition, MAC 112 includes a burst CDR generation register 112A that defines the burst CDR reset pulse RST. The burst CDR generation register holds an N-bit value that defines a position before a defined point in each upstream cell, a K-bit value that defines a width of the burst CDR reset pulse RST, and a G-bit value that defines the active state polarity.

In the present example, the width of the burst CDR reset pulse RST is set to match the width required by the start of frame pulse SOF, i.e., four bit times (four second-clock CLK2 periods). Thus, four rising edges of the second clock signal CLK2 or four phases occur during the burst CDR reset pulse RST. Further, the active state polarity is set to match the polarity required by the start of frame SOF pulse, i.e., active high. In addition, the position of the rising edge of the burst CDR reset pulse RST can be advanced or retarded in time with one-bit granularity by changing the N-bit value held by burst CDR generation register 112A.

Communication system 100 further includes a processor 114, a memory 116, and a communication path BUS that is connected to MAC 112, processor 114, and memory 116. In the present example, processor 114 is connected to burst CDR generation register 112A of MAC 112 to write a value into the N-bit, K-bit, and G-bit fields of register 112A, which is addressable via communication path BUS.

Processor 114, which can be implemented with, for example, a 32-bit processor, operates on data in response to program instructions. Memory 116 stores an operating system and a set of program instructions. The operating system can be implemented with, for example, the VxWorks operating system, although other operating systems can alternately be used. The program instructions can be written in, for example, C although other languages can alternately be used.

In addition, as described in greater detail below, memory 116 also stores data, which includes a look up table that lists a number of verified phase values, such as four verified phase values, and a corresponding number of register values. (Communications system 100 also includes circuitry for inserting information into memory 116, and removing information from memory 116.)

In accordance with the present invention, communication system 100 includes a dynamic adaptive phase aligner (DAPA) circuit 118 that generates and outputs the start of frame pulse SOF in response to the first and second clock signals CLK1 and CLK2 from TM 110, and the burst CDR reset pulse RST from MAC 112. DAPA circuit 118 generates and outputs the start of frame pulse SOF so that the rising edge of the first clock signal CLK1 occurs during the start of frame pulse SOF, and coincides with a phase of the start of frame pulse SOF.

In addition, DAPA circuit 118 also determines which phase of the start of frame pulse SOF coincides with the rising edge of sampled clock signal to generate a measured phase value. Further, DAPA circuit 118 determines when the measured phase value has remained the same a predefined number of times. When the measured phase value has remained the same the predefined number of times, DAPA circuit 118 generates and outputs a validated phase value VBV that indicates the measured phase value that has remained the same.

Processor 114 reads the validated phase value VBV from DAPA circuit 118 via communication path BUS (as shown by the dashed lines connected to DAPA circuit 118). Processor 114 then writes a register value into burst CDR generation register 112A based on the validated phase value VBV to insure that the rising edge of the first clock signal CLK1 coincides with, for example, the third rising edge of phase of the start of frame pulse SOF.

Figure 2:
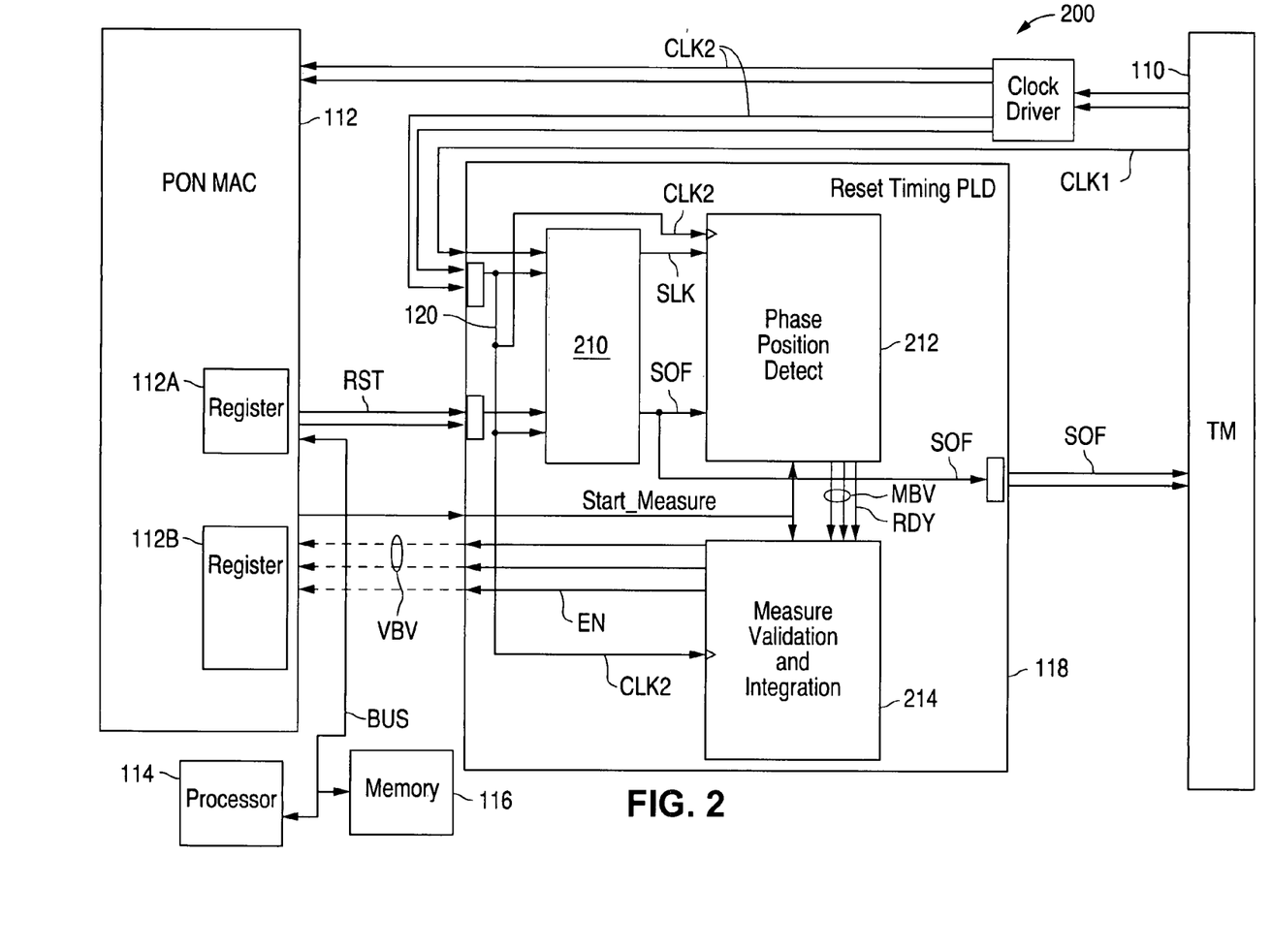
FIG. 2 is a block diagram illustrating an example of an embodiment 200 of communication system 100 in accordance with the present invention.

FIG. 2 shows a block diagram that illustrates an example of an embodiment 200 of communication system 100 in accordance with the present invention. As shown in FIG. 2, DAPA circuit 118 of embodiment 200 includes a sampling circuit 210 that generates and outputs a sampled clock signal SLK in response to the first clock signal CLK1 and the second clock signal CLK2.

In addition, sampling circuit 210 generates and outputs a start of frame pulse SOF in response to a burst CDR reset pulse RST and the second clock signal CLK2. The start of frame pulse SOF has a width, which has an integer number of phases that are defined by a corresponding number of second clock periods. The sampled clock signal SLK has a rising edge that coincides with a phase of the start of frame pulse SOF.

As further shown in FIG. 2, DAPA circuit 118 of embodiment 200 also includes a phase position detect circuit 212 that is connected to sampling circuit 210 to determine which phase of the start of frame pulse SOF coincides with the rising edge of the sampled clock signal SLK to form a measured phase value MBV. In addition, phase position detect circuit 212 outputs the measured phase value MBV.

DAPA circuit 118 of embodiment 200 additionally includes a measure validation and integration circuit 214 that is connected to phase position detect circuit 212 to determine when phase position detect circuit 212 outputs a predefined number of consecutive measured phase values MBV with the same value. Further, phase position detect circuit 212 and measure validation and integration circuit 214 are enabled by a start signal Start_Measure.

Figure 3:
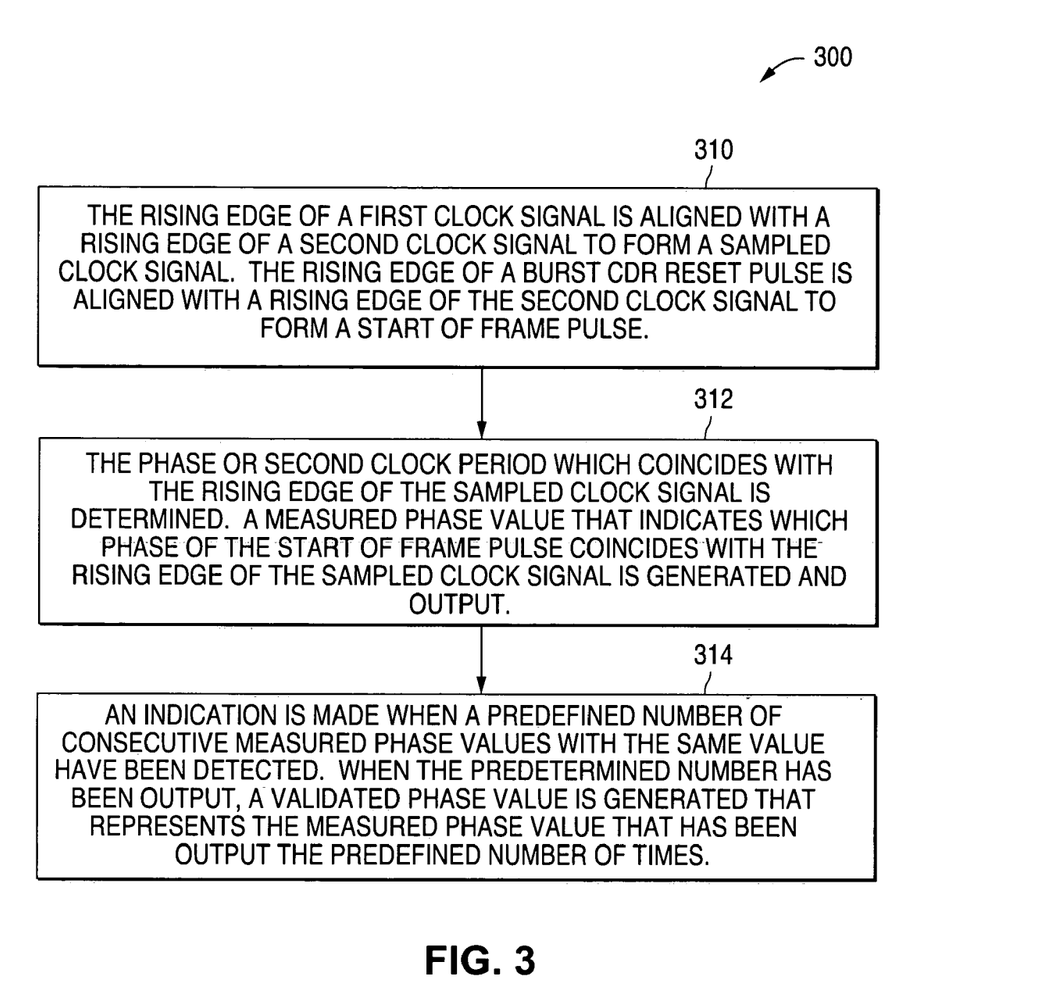
FIG. 3 is a flow chart illustrating an example of a method 300 of operating an interface circuit in accordance with the present invention.

FIG. 3 shows a flow chart that illustrates an example of a method 300 of operating an interface circuit in accordance with the present invention. As shown in FIG. 3, at 310, the rising edge of a first clock signal is aligned with a rising edge of a second clock signal to form a sampled clock signal. For example, sampling circuit 210 aligns the rising edge of the first clock signal CLK1 with a rising edge of the second clock signal CLK2 to form the sampled clock signal SLK.

In addition, the rising edge of a burst CDR reset pulse is aligned with a rising edge of the second clock signal to form a start of frame pulse. For example, sampling circuit 210 aligns the rising edge of the burst CDR reset pulse RST with a rising edge of the second clock signal CLK2 to form the start of frame pulse SOF.

As noted above, the burst CDR reset pulse RST and the start of frame pulse SOF have widths that are equal to a number of second clock periods, e.g., four. As a result, the rising edge of the sampled clock signal SLK can occur during the start of frame pulse SOF, and coincide with the rising edge of one of second clock periods.

At 312, the phase or second-clock rising edge which coincides with the rising edge of the sampled clock signal is determined. For example, phase position detect circuit 212 determines which phase or second-clock rising edge of the start of frame pulse SOF coincides with the rising edge of the sampled clock signal SLK.

In addition, a measured phase value that indicates which phase of the start of frame pulse coincides with the rising edge of the sampled clock signal is generated and output. For example, phase position detect circuit 212 outputs a measured phase value MBV that indicates which phase of the start of frame pulse SOF coincides with the rising edge of the sampled clock signal SLK.

At 314, an indication is made when a predefined number of consecutive measured phase values with the same value have been detected. For example, over time, sampling circuit 210 receives a series of burst CDR reset pulses RST, and outputs a series of start of frame pulses SOF.

As a result, over time, phase position detect circuit 212 outputs a series of measured phase values MBV. Measure validation and integration circuit 214, in turn, determines when phase position detect circuit 212 has output the predefined number of consecutive measured phase values MBV with the same value.

Further, when the predetermined number has been output, a validated phase value is generated that represents the measured phase value that has been output the predefined number of times. For example, measure validation and integration circuit 214 generates a validated phase value VBV that represents the measured phase value MBV that has been output the predefined number of times.

As described in greater detail below, processor 114 reads the validated phase value VBV from measure validation and integration circuit 214 via communication path BUS (as shown by the dashed lines connected to register 112B). Based on the validated phase value VBV, processor 114 writes a register value into burst CDR generation register 112A.

Figure 4:
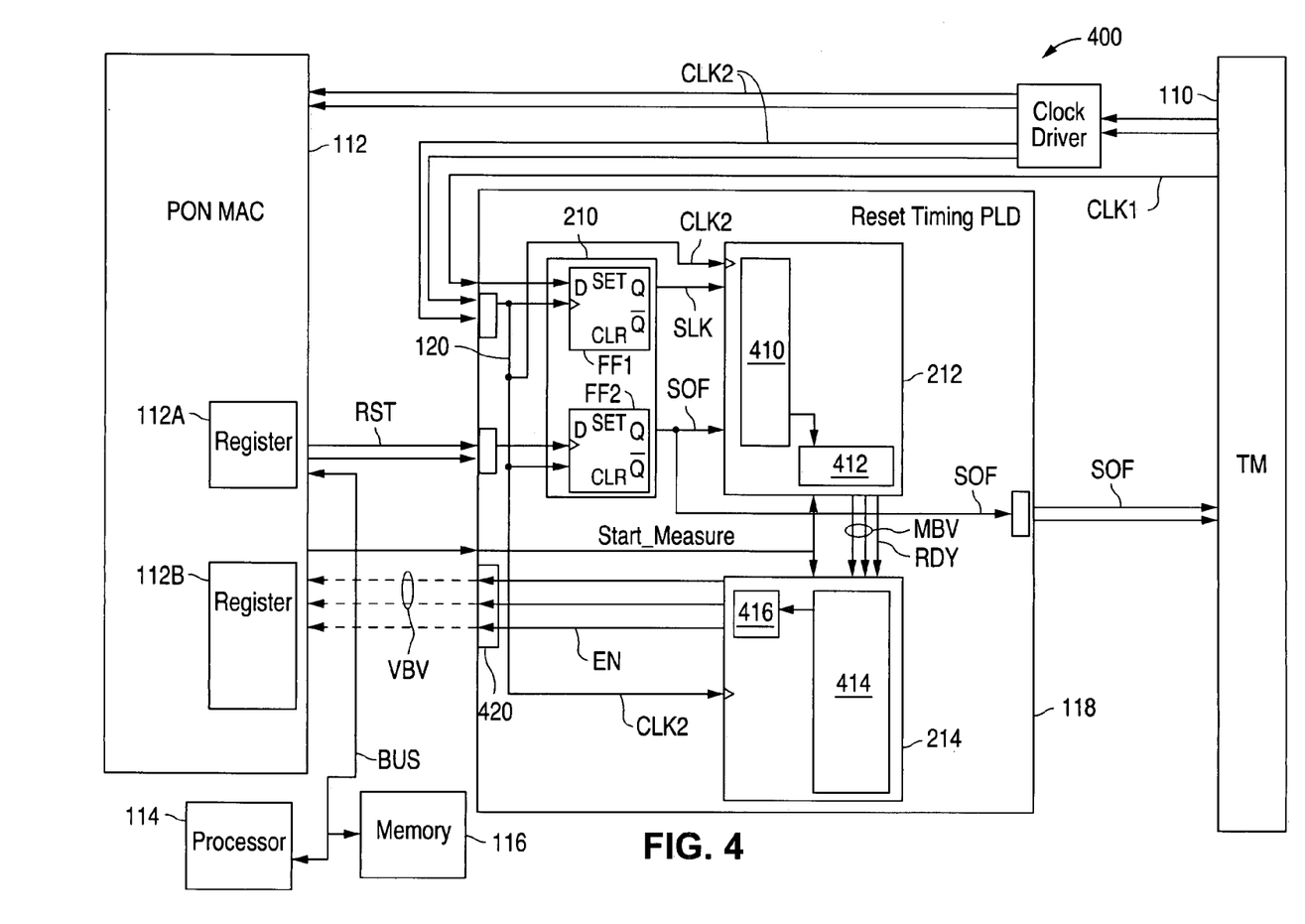
FIG. 4 is a block diagram illustrating an example of an embodiment 400 of communication system 100 in accordance with the present invention.

FIG. 4 shows a block diagram that illustrates an example of an embodiment 400 of communication system 100 in accordance with the present invention. As shown in the FIG. 4 embodiment, sampling circuit 210 can include a first flip flop FF1 and a second flip flop FF2. Flip flop FF1 has a D input that receives the first clock signal CLK1, and a clock input that receives the second clock signal CLK2. Flip flop FF1 also has a Q output that generates the sampled clock signal SLK, which has a logic high when the first clock signal CLK1 is high on the rising edge of the second clock signal CLK2, and a logic low when the first clock signal is low on the rising edge of the second clock signal.

Flip flop FF2 has a D input that receives the burst CDR reset pulse RST, and a clock input that receives the second clock signal CLK2. Flip flop FF2 also has a Q output that generates the start of frame pulse SOF which has a logic high when the burst CDR reset pulse RST is high on the rising edge of the second clock signal CLK2, and a logic low when the burst CDR reset pulse RST is low on the rising edge of the second clock signal CLK2.

Figure 5A:
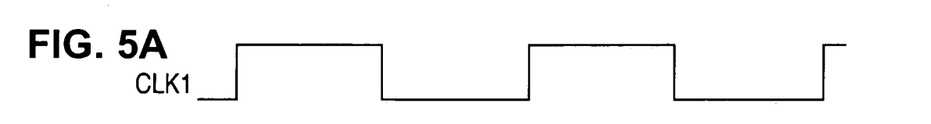
FIGS. 5A-5E are timing diagrams illustrating an example of the operation of a sampling logic circuit in accordance with the present invention.
Figure 5B:
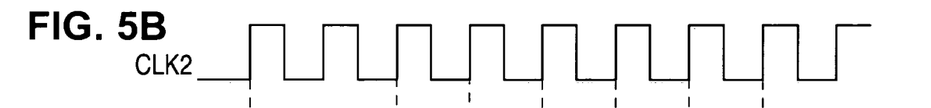
Figure 5C:
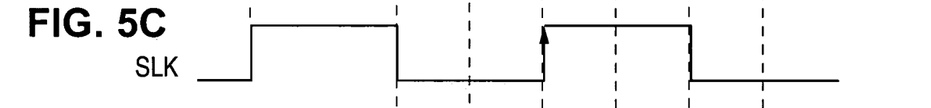

FIGS. 5A-5E show timing diagrams that illustrate an example of the operation of a sampling logic circuit, such as sampling logic circuit 210, in accordance with the present invention. As shown in FIGS. 5A-5C, the sampled clock signal SLK has a period which is substantially identical to the period of the first clock signal CLK1, and a rising edge that coincides with a rising edge of the second clock signal CLK2.

Figure 5D:
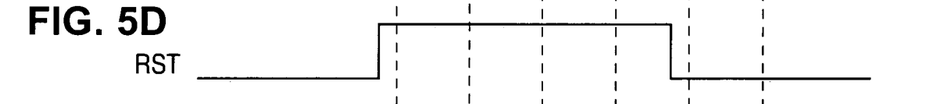
Figure 5E:
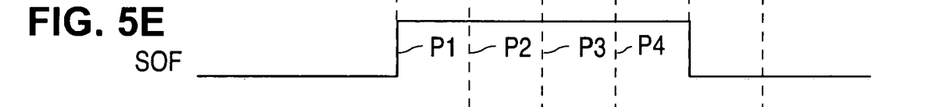

In addition, as shown in FIGS. 5B, 5D, and 5E, the start of frame pulse SOF has a period which is substantially identical to the period of the burst CDR reset pulse RST (four second-clock periods CLK2), and a rising edge that coincides with a rising edge of the second clock signal CLK2.

Further, as shown in FIGS. 5B and 5E, four phases P1-P4 or four rising edges of the second clock signal CLK2 occur during the start of frame pulse SOF. A first phase P1 of the start of frame pulse SOF coincides with the rising edge of the first of the four rising edges of the second clock signal CLK2 that occur during the start of frame pulse SOF. A second phase P2 of the start of frame pulse SOF coincides with the rising edge of the second of the four rising edges of the second clock signal CLK2 that occur during the start of frame pulse SOF.

A third phase P3 of the start of frame pulse SOF coincides with the rising edge of the third of the four rising edges of the second clock signal CLK2 that occur during the start of frame pulse SOF. A fourth phase P4 of the start of frame pulse SOF coincides with the rising edge of the fourth of the four rising edges of the second clock signal CLK2 that occur during the start of frame pulse SOF.

Further, as shown in FIGS. 5C and 5E, the sampled clock signal SLK has a rising edge that occurs at the center of the start of frame pulse SOF, i.e., on the third phase P3 or third rising edge of the four rising edges of the second clock signal CLK2 that occur during the start of frame pulse SOF. This is the desired position.

Referring again to FIG. 4, phase position detect circuit 212 can include a logic measuring circuit 410. Logic measuring circuit 410 can determine which phase P1-P4 of the start of frame pulse SOF coincides with the rising edge of the sampled clock signal SLK by detecting the logic state of the sampled clock signal SLK that occurs with and after the detection of a 4-bit wide high on the start of frame pulse SOF.

Logic measuring circuit 410 samples the sampled clock signal SLK on the rising edge of the start of frame pulse SOF to determine a first logic state. In addition, logic measuring circuit 410 samples the sampled clock signal one second-clock period after the rising edge of the start of frame pulse SOF to determine a second logic state.

For example, as shown in FIGS. 5C and 5E, when the rising edge of the start of frame pulse SOF is coincident with the falling edge of the sampled clock signal SLK, the logic state of the sampled clock signal SLK is detected as low. In addition, one second-clock period later, the logic state of the sampled clock signal SLK remains the same. (For robustness, six samples of the start of frame pulse SOF can be taken, which consist of the four logic 1's of the SOF pulse, which is preceded by a logic 0 and succeeded by a logic 0.)

This is a unique sequence that indicates that the rising edge of the sampled clock signal SLK coincides with phase P3 or the third rising edge of the four rising edges of the second clock signals CLK2 that define the start of frame pulse SOF. Thus, when the logic state of the start of frame pulse SOF is high and the logic state of the sampled clock signal SLK is low two second-clock periods in a row, phase position detect circuit 212 reports that the rising edge of the sampled clock signal SLK coincides with the center of the start of frame pulse SOF.

Referring again to FIG. 4, phase position detect circuit 212 can also include an output circuit 412 that generates a series of measured phases values MBV. Output circuit 412 can report the phase of the start of frame pulse SOF that coincides with the rising edge of the sampled clock signal SLK in a measured phase value MBV.

For example, output circuit 412 can output the measured phase value MBV as a binary 0-0 when the rising edge of the sampled clock signal SLK coincides with phase P3 or the third rising edge of the four second-clock signals CLK2 that define the start of frame pulse SOF. In this case, a 0-0 output indicates that no phase change is necessary.

Figure 6A:
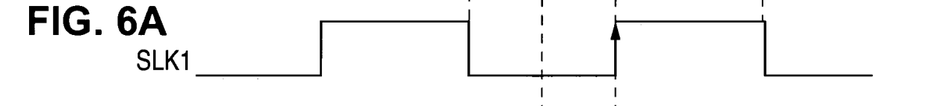
FIGS. 6A-6C are timing diagrams illustrating an example of the operation of a phase position detect circuit in accordance with the present invention.
Figure 6B:
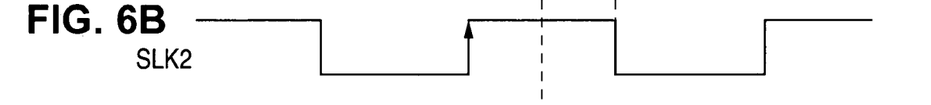
Figure 6C:
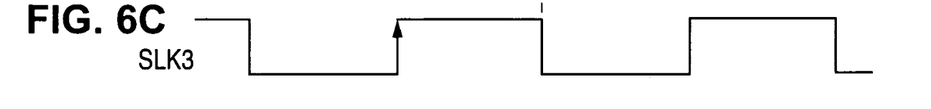

FIGS. 6A-6C show timing diagrams that illustrate an example of the operation of a phase position detect circuit, such as phase position detect circuit 212, in accordance with the present invention. FIGS. 6A-6C illustrate the potential positions of the sampled clock signal SLK with respect to the start of frame pulse SOF when the rising edge of the sampled clock signal SLK does not coincide with the center of the start of frame pulse SOF.

FIG. 6A shows a sampled clock signal SLK1 that is shifted one phase to the right. As shown in FIGS. 5E and 6A, when the rising edge of the start of frame pulse SOF occurs in the middle of the high period of a sampled clock pulse, the logic state of the sampled clock signal SLK1 is high. However, one second-clock period later, the logic state of the sampled clock signal SLK1 is low.

This is also a unique sequence that indicates that the rising edge of the sampled clock signal SLK1 coincides with phase P4 or the fourth rising edge of the four second-clock signals CLK2 that define the start of frame pulse SOF. Phase position detect circuit 212 can report that the rising edge of the sampled clock signal SLK is aligned with phase P4 by outputting a measured phase value MBV of, for example, 0-1. In this case, a 0-1 output indicates that the phase of the start of frame pulse SOF is to be delayed by one CLK2 period.

FIG. 6B shows a sampled clock signal SLK2 that is shifted one phase to the left. As shown in FIG. 6B, when the rising edge of the start of frame pulse SOF is coincident with the middle of the low period of the sampled clock pulse, the logic state of the sampled clock signal SLK2 is low. One second-clock period later, however, the logic state of the sampled clock signal SLK2 is high.

This is a unique sequence that indicates that the rising edge of the sampled clock signal SLK2 coincides with phase P2 or the second rising edge of the four second-clock signals CLK2 that define the start of frame pulse SOF. Phase position detect circuit 212 can report that the rising edge of the sampled clock signal SLK2 is aligned with phase P2 by outputting a measured phase value MBV of, for example, 1-0. In this case, a 0-1 output indicates that the phase of the start of frame pulse SOF is to be advanced by one CLK2 period.

FIG. 6C shows a sampled clock signal SLK3 that is shifted two phases to the left. As shown in FIG. 6C, when the rising edge of the start of frame pulse SOF is coincident with the rising edge of the sampled clock signal SLK3, the logic state of the sampled clock signal SLK3 is high. One second-clock period later, the logic state of the sampled clock signal SLK3 remains high.

This is a unique sequence that indicates that the rising edge of the sampled clock signal SLK3 coincides with phase P1 or the first rising edge of the four second-clock signals CLK2 that define the start of frame pulse SOF. Phase position detect circuit 212 can report that phase P2 is aligned with the rising edge of the sampled clock signal SLK3 by outputting a measured phase value MBV of, for example, 1-1. In this case, a 1-1 output indicates that the phase of the start of frame pulse SOF is to be advanced two CLK2 periods.

Thus, the measured phase value MBV output by phase position detect circuit 212 indicates the shifting that is necessary to bring the center of the start of frame pulse SOF into alignment with the rising edge of the sampled clock signal SLK. In addition to the measured phase value MBV, phase position detect circuit 212 can also output an enable signal RDY that indicates whether a 4-bit wide reset pulse SOF was received.

Referring again to FIG. 4, measure validation and integration circuit 214 can include an integrating circuit 414 that counts a number of times that a measured phase value MBV has been consecutively output with a same value (when the enable signal RDY output by phase position detect circuit 212 is asserted).

Measure validation and integration circuit 214 can also include a result circuit 416 that generates a validated phase value VBV that represents a measured phase value MBV that has been received a predefined number of times. In addition, result circuit 416 can assert an enable signal EN when the measured phase value MBV has been output a predefined number of times with the same value. Thus, when the enable signal is asserted, the validated phase value VBV represents a measured phase value MBV that has been received the predefined number of times.

Over time, output circuit 412 outputs a series of measured phase values MBV. Integrating circuit 414 receives the series of measured phase values MBV. When the measured phase values MBV are the same Z times in a row, where Z is an odd integer that is greater than one, result circuit 416 asserts the enable signal EN.

For example, result circuit 416 can assert the enable signal EN only after the measured phase value MBV has been the same 7 times in a row. Thus, by requiring a predetermined number of the same values, measure validation and integration circuit 214 removes any jitter or noise from the system.

In addition, when integrating circuit 414 detects a change in the measured phase value MBV received from phase position detect circuit 212, result circuit 416 de-asserts the enable signal EN and holds the validated phase value VBV so that the validated phase value VBV retains the value that was present just before the change in the measured phase value MBV was detected. The enable signal EN remains de-asserted until the measured phase value MBV is the same Z times in a row.

The validated phase value VBV and the enable signal EN can be output from result circuit 416 to an output register 420 of DAPA circuit 118. The validated phase value VBV and the enable signal EN can be read by connecting communication path BUS to output register 420 on DAPA circuit 118 (as shown by the dashed lines connected to communication path BUS).

In an alternate embodiment, MAC 112 can include a validated value register 112B. In the alternate embodiment, MAC 112 receives the validated phase value VBV and the enable signal EN from output register 420 and stores the information in validated value register 112B. Processor 114 then reads the information from validated value register 112B via communication path BUS (as shown by the dashed lines connected to register 112B).

In the present example, sampling logic circuit 210, phase position detect circuit 212, and measure validation and integration circuit 214 can be implemented using, for example, a programmable logic device (PLD), such as the ispXPLD (Part No.: LC5256MV-5F256I) manufactured by Lattice Semiconductor Corporation. In addition, TM 110 can be implemented with, for example, Model No. OD-B6211-L31-A052 manufactured by the NEC Corporation. Further, MAC 112 can be implemented with, for example, Model No. XL23OFP manufactured by the Broadlight Corporation.

Figure 7:
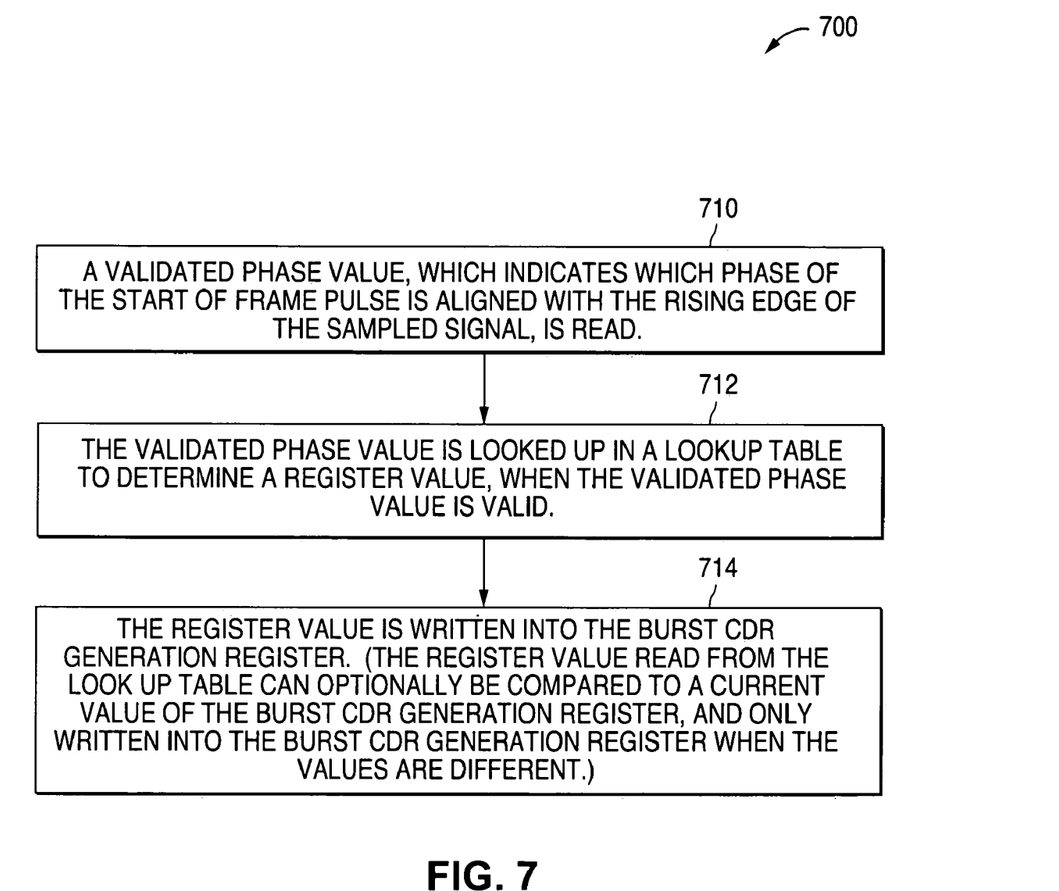
FIG. 7 is a flow chart illustrating an example of a method 700 of determining a value for burst CDR generation register 112A in accordance with the present invention.

FIG. 7 shows a flow chart that illustrates an example of a method 700 of determining a value for burst CDR generation register 112A in accordance with the present invention. As shown in FIG. 7, at 710, a validated phase value, which indicates which phase of the start of frame pulse SOF is aligned with the rising edge of the sampled signal SLK, is read. For example, processor 114 can read a validated phase value VBV from validated value register 112B or output register 420.

At 712, the validated phase value is looked up in a lookup table to determine a register value, when the validated phase value is valid (enable signal EN is valid). At 714, the register value is written into the burst CDR generation register. For example, processor 114 can look up the validated phase value VBV in memory 116 to identify a register value, and can then write the register value into burst CDR generation register 112A via communication path BUS. The register value, in turn, can change the edge of the burst CDR reset pulse RST by one or two bit times (one or two second-clock periods) which, in turn, changes the edge of the start of frame pulse SOF by one or two bit times (one or two second-clock periods).

In addition, at 714, the register value read from memory can optionally be compared to a current value of burst CDR generation register 112A, and only written into burst CDR generation register 112A when the values are different. This option eliminates the need to continually write to burst CDR generation register 112A.

In the present example, the seed value originally placed in burst CDR generation register 112A, which can be an empirically determined value, takes into account all of the delays from MAC 112 through DAPA circuit 118 to TM 110 to place the rising edge of the start of frame signal SOF at the correct point as required by TM 110.

When the register value is placed in burst CDR generation register 112A, the register value advances or retards the position of the start of frame pulse SOF (via the burst CDR reset pulse RST) by one bit time (one second-clock period). In two of the cases, moving the start of frame pulse SOF one bit time one way or the other causes the rising edge of the sampled clock signal SLK to occur at the center of the start of frame pulse SOF. In the other case, an additional move is required.

Thus, the present invention allows a TM and a MAC, which have incompatible interfaces, to be connected together and satisfy the timing requirements of the TM. In addition, processor 114 and DAPA circuit 118 continually monitor the system to detect any changes in the measured phase value MBV that may occur over time. Further, DAPA circuit 118 insures that measurement jitter and noise are removed.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. An interface circuit comprising:
a sampling circuit to generate and output a sampled clock signal on a first node in response to a first clock signal and a second clock signal, and a start of frame pulse in response to a reset pulse received on a second node and the second clock signal, the first node and second node being electrically disconnected, the start of frame pulse having a width, the width having an integer number of phases defined by a corresponding number of second clock periods, the sampled clock signal having a rising edge that coincides with a phase of the start of frame pulse.

2. The interface circuit of claim 1, further comprising a phase position detect circuit connected to the sampling circuit to determine which phase of the start of frame pulse coincides with the rising edge of the sampled clock signal to form a measured phase, and output the measured phase.

3. The interface circuit of claim 2, wherein the phase position detect circuit comprises a logic measuring circuit to sample the sampled clock signal on the rising edge of the start of frame pulse to determine a first logic state.

4. The interface circuit of claim 3, wherein the logic measuring circuit to sample the sampled clock signal one second-clock period after the rising edge of the start of frame pulse to determine a second logic state.

5. The interface circuit of claim 4, wherein the logic measuring circuit to determine a measured phase in response to the first and second logic states, the first and second logic states uniquely defining which phase of the start of frame pulse coincides with the rising edge of the sampled clock signal.

6. The interface circuit of claim 5, wherein the phase position detect circuit further comprises an output circuit connected to the logic measuring circuit to generate a series of measured phases.

7. The interface circuit of claim 2, wherein the phase position detect circuit to output a series of measured phases over a time period.

8. The interface circuit of claim 7, further comprising a measure validation and integration circuit connected to the phase position detect circuit to determine when the phase position detect circuit outputs a predefined number of consecutive measured phases with a same value.

9. The interface circuit of claim 8, wherein the measure validation and integration circuit comprises an integrating circuit to count a number of times that a measured phase has been consecutively output with a same value.

10. The interface circuit of claim 9, wherein the measure validation and integration circuit further comprises a result circuit to assert an enable signal when the measured phase has been output a predefined number of times with a same value.

11. The interface circuit of claim 10, wherein when the enable signal is asserted, a validated phase value represents a measured phase value that has been received the predefined number of times.

12. The interface circuit of claim 11, wherein the result circuit to deassert the enable signal when two consecutive measured phase values are different.

13. The interface circuit of claim 9, wherein the measure validation and integration circuit further comprises a result circuit to generate a validated phase value that represents a measured phase value that has been received the predefined number of times.

14. A method of operating an interface circuit, comprising:
aligning an edge of a first clock signal to an edge of a second clock signal to form a sampled clock signal; and
aligning an edge of a pulse to an edge of the second clock signal to form a start of frame pulse, the start of frame pulse having a width defined by a plurality of phases that correspond to a plurality of periods of the second clock signal, an edge of the sampled clock signal being aligned with a phase of the start of frame pulse.

15. The method of claim 14, further comprising determining which phase of the plurality of phases of the start of frame pulse is aligned with the edge of the sampled clock signal.

16. The method of claim 15, further comprising generating and outputting a measured phase value that indicates which phase of the start of frame pulse coincides with the rising edge of the sampled clock signal.

17. The method of claim 16, further comprising indicating when a predefined number of consecutive measured phase values with the same value have been detected.

18. The method of claim 17, further comprising generating a validated phase value which represents the measured phase value that has been output the predefined number of times.

19. A method of determining a value for a burst CDR generation register, comprising:
reading a first value, the first value indicating which phase of two or more phases of a start of frame pulse is aligned with a rising edge of a sampled signal, the rising edge of the sampled signal being capable of rising at different times that are coincident with two or more phases of the start of frame pulse;
looking up the first value in a look up table to determine a register value when the first value is valid; and
writing the register value into the burst CDR generation register.

20. The method of claim 19, and further comprising:
comparing the register value read from the look up table to a current value of the burst CDR generation register; and
writing the register value to the burst CDR generation register only when the register value and the current value are different.

* * * * *